126,839

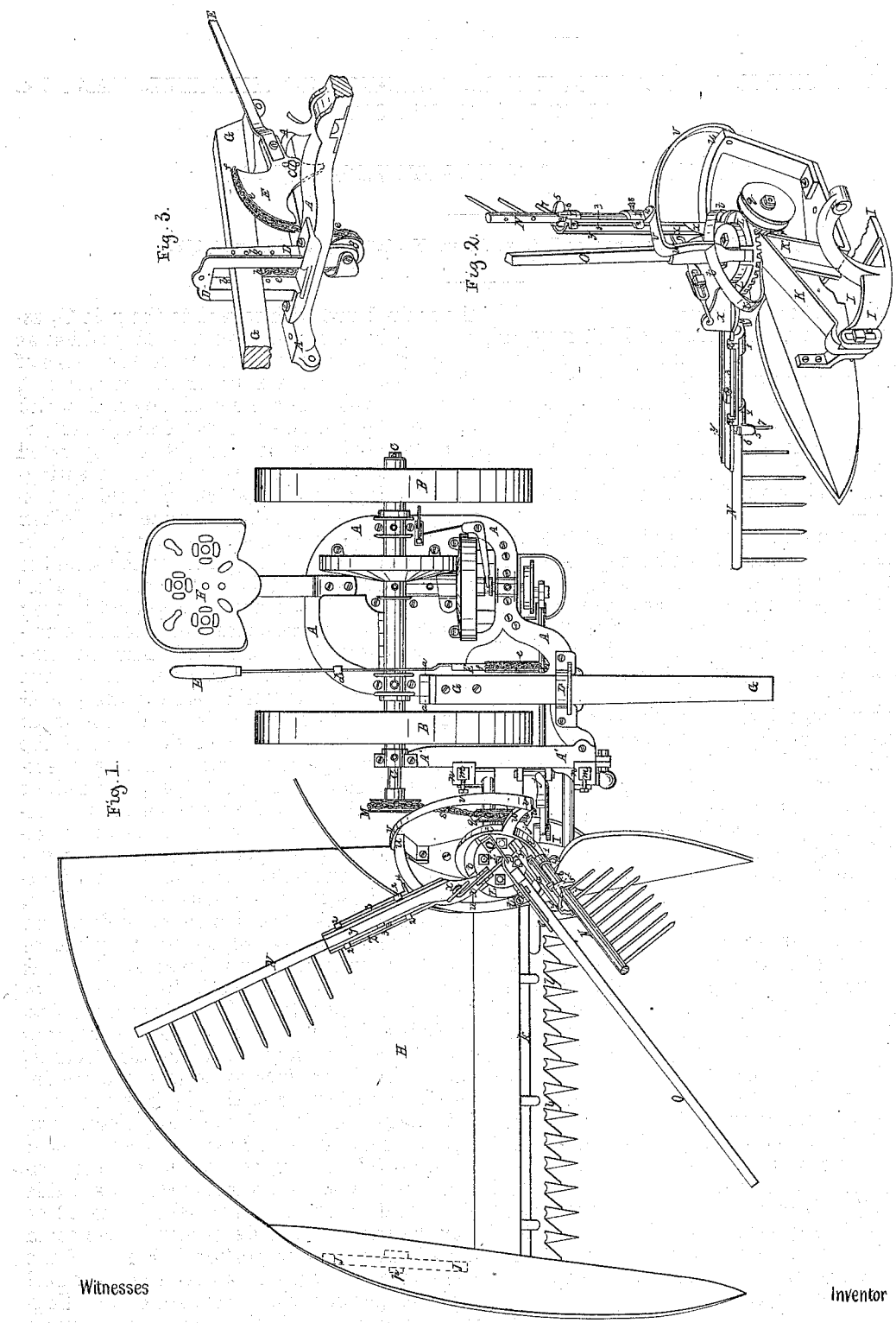

UNITED STATES PATENT OFFICE.

EDGAR M. SMITH, OF NEW YORK, N. Y., ASSIGNOR TO MITCHELL, VANCE & CO., OF SAME PLACE.

IMPROVEMENT IN HARVESTER-RAKES.

Specification forming part of Letters Patent No. 126,839, dated May 14, 1872.

*To all whom it may concern:*

Be it known that I, EDGAR M. SMITH, of the city, county, and State of New York, have invented certain new and useful Improvements in Harvesting-Machines and Rakes therefor; and I do hereby declare the following to be a full, clear, and exact description of the same, reference being had to the accompanying drawings making a part of this specification, in which—

Figure 1 represents a plan view of the machine and rake. Figs. 2 and 3 represent, in perspective, fragmentary portions of the machine and rake, not so distinctly seen in Fig. 1.

Similar letters of reference, where they occur in the separate figures, denote like parts of the machine or apparatus in all of the drawings.

My invention relates to the construction of the rake-arms and sockets so as to allow the rakes to be turned in their sockets for the purpose of converting at will the rakes into beaters, or vice versa, so as to take off larger or smaller gavels of grain, as may be required. My invention further relates to the arrangement of the continuous eccentric cam or cams used to extend the rake while moving horizontally, and to hold it up while moving in a vertical position, and then to allow the rake to slide down after passing the wheel and before striking into the grain, and finally to pass within the outer dividing-board of the platform.

To enable others skilled in the art to make and use my invention, I will proceed to describe the same in connection with the drawings.

A represents a metallic main frame, carried upon two supporting and driving-wheels, B B, that work fast and loose with the main axle C by ratchet-and-pawl connections in the usual well-known way. A portion of the frame A' next the platform and cutting apparatus is outside of the drive-wheel on that side. The balance of the main frame is between the drive-wheels. The tongue G is hinged to the main frame at $a$, and passes through a yoke, D, that is attached to the front of the said main frame, through which yoke there are adjusting or regulating holes $b$, in which a pin may be placed to define the extent of motion of the main frame with regard to the pole G, assuming the latter to have a fixed position as to height by being attached to the necks of the horses. To the main frame, at $c$, Fig. 3, there is pivoted a segmental lever, E, which extends rearward toward the driver's seat, so that it may be readily caught and operated by said driver in his seat F, and a spring-catch, $d$, is provided, which will hold said lever when pressed down and under it. When the machine is arranged for cutting and gathering grain, the chain $e$, which is connected to the segmental lever E at the point $f$, after passing around the arc or segment, is then carried down underneath and around a pulley, $g$, underneath the main frame, but suspended to said frame; and from thence the chain passes up and is hooked to the pole G at a point, $h$, all of which is clearly shown in Fig. 3. When so arranged the front of the frame and the parts or portions there connected to said frame can be tipped, lowered, or raised at will by the driver in his seat, as occasion may require. When the machine is arranged for mowing grass the chain $e$ is unhooked from the pole, and that end of it is attached to a pivoted two-armed lever, $j$, to which, by another chain, the finger-bar and cutting apparatus are suspended, so that they can be raised or lowered by the lever E. As this chain-and-lever connection is distinctly shown in another application of mine before the Patent Office, I do not deem any further description of it here as necessary. In this machine, as in others heretofore patented to me, the finger-bar $k$, cutters $l$, and the platform H and its appendages, are hinged to sliding pieces $m\ m$, that can move up and down in sockets $n\ n$ or be regulated therein, said sockets being connected to the outside frame-piece A', and this whole connection or attachment being at or near the front grain-side corner of the main frame. The part or portion I, Fig. 2, of the machine, which supports and contains the heel of the finger-bar, sickle-bar, inside dividing-board, and by which they and the platform are hinged to the slides $m$ and incidentally to the main frame, and which occupies the position, and may to an extent serve the purpose, of an inside shoe, is slotted, as at o, so that the front of the cutting apparatus may be raised, lowered, or adjusted, and then held thereto or therein permanently, the tipping further forward of the cutting apparatus and of the rake and beaters to catch, lift up, and bring in the fallen or "down grain" to the platform being the work of the driver through the lever E, and as the occasion for so doing shall require. The outside platform supporting wheel J (in dotted lines, Fig. 1) has its bearing or journal $p$ in line with the main axle $c$, so that the tipping of the main frame, platform, cutters, and rake may be all from the same line of motion. On support K, raised on or connected to the piece I, which may be termed, from its position and duty, the inner shoe or finger-bar extension, is placed a rake-wheel, L, which is revolved by a bevel-pinion, $r$, connected to a chain-pulley, $q$, which latter is driven from a similar pulley, M, on the main axle C, by means of the chain, belt, or band $s$. The rakes N and beaters or rollers O are pivoted to the rake-wheel L, so that while they move around with said wheel they may have motions other than that given them by said wheel—as, for instance, a rising-and-falling motion, which all have—while the rakes have other motions in addition to the rising-and-falling one, as will be explained. An irregular cam-way, $t$, nearly surrounds the rake-wheel, with an inclined face descending from toward the main frame to the platform, and at a line about in the plane of the cutters this cam-way extends out nearly horizontal, as shown at $u$. In connection with the cam-way $t\ u$ there is another cam-way, $v$, beginning where the one, $u$, terminates, and rises quite abruptly, and extending forward until, at the point $w$, it drops very suddenly and unites with the cam-way $t$. The cam-ways $t\ u\ v$ entirely surround the rake-wheel and influence the rakes and beaters in their motions and operations. On the rake-shanks $x$ there is cast or otherwise connected a cap, $y$, that is hollow underneath, and to or on these caps there is connected a rake-holder, $z$, which has sockets 1 1 upon it for holding the rake-stale or handle; lugs 2 2, for taking on or over the ways 3 on the cap, to guide it while it slides thereon; a tail-piece, 4, for riding on or against the cam-ways; a brace, 5, to catch and support the rake, and notches or recesses 6, for receiving a pin or tooth, 7, of the rake, so that the rake can be turned quarter around, more or less, in its socket or holder, to convert it into a beater by causing its back to move against the grain, or turn it the other way to become a rake by moving its teeth toward the grain. There is also a stop for defining the extent that the rake may move out, and to prevent it from leaving the cap or shank $y\ x$. When the rake is to be turned in its socket or slide the set-screw 8, Fig. 2, is run back, and the rake-handle or stale drawn forward, turned round a half circle, and then slid back until its pin or tooth 7 takes into the diametrically-opposite slot 6, and the set-screw is again run up. If the grain to be cut and raked off into gavels be heavy, then both rakes may work as rakes and form gavels of suitable size for convenient handling. If the grain be thin on the ground, then one of the rakes may be turned in its bearings to convert it into a beater and the other rake clear the platform; and when the machine is adjusted for the kind of work it is to do, the operator or driver in his seat, by means of the lever E, raises and lowers or tilts the cutters and rake, so that the fallen as well as the standing grain may be brought up to the cutters, severed, and raked off in good order. Suppose one of the rakes to have just cleared the platform, and swept off and dropped the gavel behind the drive-wheel and out of the path of the machine on its next round, that rake then rises up onto the steep cam-way $v$ and into a nearly perpendicular position, and so remains until it arrives at or over the part $w$, when the rake and its slide drop down upon the cam-way $t$, shortening the rake to that extent, and at the same time it reaches into or under, as the case may be, the uncut grain, and brings it up to the cutters. The grain having been cut and dropped upon the platform the rake starts it back in the line in which it was dropped upon the platform, and the lug 4 on the rake-slide $z$ being on the outside of the cam-way, and said cam-way, as at $u$, being less abrupt than at $t$, and extending rearward and somewhat conforming to the elongated and circular form of the grain table or platform, the rake, by means of said lug and cam-way, is moved outward or extended so as to follow the platform and sweep off the grain onto the ground in compact form, as above stated, and in its extended position mounts the cam-way $v$ and drops back at $w$, as above described, and so on. The second rake goes through the same motions, whether it be a reel or a rake.

It will be perceived that a portion of the cam-way $t$ is continued around opposite to the cam-way $v$, and though I have described the rakes as governed by the cam-way $v$ only on that part of their circuit, yet they may be in a measure directed and supported by the cam-way $t$, while the steeper-way $v$ keeps them up in their vertical or nearly so position to insure their clearance over and past the drive-wheel.

The beaters $o$ may be controlled solely by the cam-way $t$, as they have not the elongating and shortening motions of the rakes, or the motions to and from their center of rotation.

Having thus fully described my invention, what I claim therein as new, and desire to secure by Letters Patent, is—

1. I claim, in combination with the rake and its holder, the sockets for receiving, and the slot and pin or rake-tooth for allowing the rake to be turned quarter around therein to convert it from a rake to a beater, or vice versa, substantially as described.

2. I also claim, in combination with an extension rake and beaters, operating substantially as herein set forth, the continuous eccentric cam-ways for giving them all their motions, except that around and with their turning-head, as set forth.

EDGAR M. SMITH.

Witnesses:
WILLIAM H. REYNOLDS,
JOHN H. SELMES.